United States Patent [19]

Chudy et al.

[11] Patent Number: 5,353,659
[45] Date of Patent: Oct. 11, 1994

[54] MECHANISM FOR CONVERTING OSCILLATORY ROTATION OF INPUT SHAFT TO UNIDIRECTIONAL ROTATION OF OUTPUT SHAFT

[75] Inventors: Andrzej M. Chudy, Grayslake; Janusz Figiel, Mount Prospect; Peter Drabarek, Chicago, all of Ill.

[73] Assignee: Signode Corporation, Glenview, Ill.

[21] Appl. No.: 133,284

[22] Filed: Oct. 8, 1993

[51] Int. Cl.$^5$ .................. F16H 27/02; F16H 55/17
[52] U.S. Cl. .................. 74/88; 74/143; 74/435
[58] Field of Search .......... 74/88, 126, 35, 130, 74/131, 132, 133, 134, 141.5, 142, 143, 417, 423, 435, 437, 810.1

[56] References Cited

U.S. PATENT DOCUMENTS

| | | | |
|---|---|---|---|
| 167,194 | 8/1875 | Pelton | 74/143 |
| 319,513 | 6/1885 | Schulze-Berge | 74/437 |
| 832,077 | 10/1906 | Pearce . | |
| 1,197,013 | 9/1916 | Cummings . | |
| 1,543,464 | 6/1925 | Welborn | 74/143 |
| 2,784,610 | 3/1957 | Block | 74/437 X |
| 4,825,512 | 5/1989 | Tremper et al. | 24/20 EE |
| 4,862,759 | 9/1989 | Trevelyan et al. | 74/417 |
| 5,136,888 | 8/1992 | Nix | 74/88 |

FOREIGN PATENT DOCUMENTS

| | | | |
|---|---|---|---|
| 746302 | 11/1933 | France | 74/143 |
| 56-3348 | 1/1981 | Japan | 74/810.1 |
| 618630 | 7/1978 | U.S.S.R. | 74/810.1 |

OTHER PUBLICATIONS

Pictorial Handbook of Technical Devices, Chemical Publishing Co., Inc. (1971) pp. 60 and 61–Grafstein et al.

Primary Examiner—David W. Laub
Attorney, Agent, or Firm—T. W. Buckman; D. J. Breh

[57] ABSTRACT

A mechanism is disclosed for converting oscillatory rotation of an input shaft to unidirectional rotation of an output shaft. An input shaft journalled to a frame is rotatable about an input axis, over a range of rotational positions, between a forward limit and a reverse limit. An output shaft journalled to the frame is rotatable about an output axis, which is normal to the input axis. Three bevel gears are employed, namely a first gear coupled to the input shaft, a second gear coupled to the input shaft and spaced axially from the first gear, and a third gear coupled to the output shaft. The bevel teeth of the three gears are arranged in peripheral arrays covering cover less than one half of the entire periphery of each gear, so that the bevel teeth of the third gear intermesh only with the bevel teeth of the first gear whenever the input shaft rotates from the reverse limit toward the forward limit, and so that the bevel teeth of the third gear intermesh only with the bevel teeth of the second gear whenever the input shaft rotates from the forward limit toward the reverse limit.

6 Claims, 6 Drawing Sheets

MECHANISM FOR CONVERTING OSCILLATORY ROTATION OF INPUT SHAFT TO UNIDIRECTIONAL ROTATION OF OUTPUT SHAFT

TECHNICAL FIELD OF THE INVENTION

This invention pertains to a novel mechanism for converting oscillatory rotation of an input shaft to unidirectional rotation of an output shaft. The novel mechanism can be advantageously employed in a strapping tool of a type having an actuating handle arranged to be manually oscillated.

BACKGROUND OF THE INVENTION

In a strapping tool of a type used to apply a steel strap in a tensioned loop around a package and to join the strap via a series of interlocking joints comprising interlockable shoulders punched into overlapped ends of the strap, an actuating handle is provided, which is arranged to be manually oscillated. The handle rotates an output shaft, which actuates a series of cams, via an input shaft, to which the handle is coupled, and intermediate gears. The cams drive a series of punches, which punch interlockable shoulders into overlapped ends of the strap. Tremper et al. U.S. Pat. No. 4,825,512 provides a recent example of such a strap having such a series of interlocking joints.

Moreover, in a strapping tool of the type noted above, a mechanism is provided for converting oscillatory motion of the actuating handle to unidirectional rotation of the output shaft. Typically, heretofore, the converting mechanism has employed a unidirectional clutch to couple the handle to the input shaft upon forward motion of the handle and to decouple the handle from the input shaft upon reverse motion of the handle. Thus, reverse motion of the handle has been unproductive, except to reset the handle for forward motion. Typically, moreover, two strokes of forward motion of the handle have been required to provide one complete rotation of the output shaft for one complete stroke of the punches.

A mechanism employing bevel gears and ratchet wheels for converting oscillatory rotation of an input shaft to unidirectional rotation of an output shaft is known. Such a mechanism is exemplified in Grafstein et al., *Pictorial Handbook of Technical Devices*, Chemical Publishing Co., Inc. (1971) at pages 60 and 61. However, if it were employed in a strapping tool of the type noted above, such a mechanism would not be entirely satisfactory. Such a mechanism does not limit oscillatory rotation of the input shaft to any specific range and does not limit unidirectional rotation of the output shaft to any specific range. In a strapping tool of the type noted above, however, it is desirable to limit oscillatory rotation of the input shaft to a specific range (e.g. approximately 180°) and to limit unidirectional rotation of the output shaft to one complete rotation in each operating cycle.

An improved mechanism employing three bevel gears for converting oscillatory rotation of an input shaft to unidirectional rotation of an output shaft, as in a strapping tool of the type noted above, is disclosed in Nix U.S. Pat. No. 5,136,888. As disclosed therein, a first gear and a second gear are mounted around the input shaft so as to permit relative rotation between each of the first and second gears and the input shaft. Also, a third gear intermeshed with those two gears is coupled to the output shaft so as to enable conjoint rotation of the third bevel gear and the output shaft. Further, each gear mounted around the input shaft can be alternately coupled to and uncoupled from the input shaft via an associated pawl disposed in a socket in the input shaft and biased toward an operative position, in which the associated pawl is extended into a recess in a bearing surface of such gear.

SUMMARY OF THE INVENTION

This invention provides a novel mechanism, which is simpler than the mechanism disclosed in the Nix patent noted above, for converting oscillatory rotation of an input shaft to unidirectional rotation of an output shaft. The novel mechanism may be advantageously employed in a strapping tool of the type noted above. The novel mechanism has other uses, as in a winding apparatus, such as a winch.

The novel mechanism comprises a frame, to which the input and output shafts are journalled. The input shaft defines an input axis, about which it is rotatable over a range of rotational positions of the input shaft relative to the frame, between a forward limit of the range and a reverse limit of the range. The output shaft defines an output axis, about which it is rotatable, and which is normal to the input axis.

The novel mechanism comprises three bevel gears, each having a peripheral array of bevel teeth, namely a first gear coupled to the input shaft so as to enable conjoint rotation of the first gear and the input shaft, a second gear coupled to the input shaft so as to enable conjoint rotation of the second gear and the input shaft, and a third gear coupled to the output shaft so as to enable conjoint rotation of the third gear and the output shaft. The first and second gears are spaced axially from each other along the input shaft.

The bevel teeth of the three gears are arranged so that the bevel teeth of the third gear intermesh only with the bevel teeth of one of the first and second gears whenever the input shaft rotates between the forward and reverse limits. Preferably, the bevel teeth of the three gears are arranged so that the bevel teeth of the third gear intermesh only with the bevel teeth of the first gear whenever the input shaft rotates from the reverse limit toward the forward limit and so that the bevel teeth of the third gear intermesh only with the bevel teeth of the second gear whenever the input shaft rotates from the forward limit toward the reverse limit.

In a preferred embodiment, an endmost one of the bevel teeth of the first gear is disposed to engage an endmost one of the bevel teeth of the third gear, at a given end of the peripheral array of bevel teeth of the third gear, and the peripheral gap between the bevel teeth of the third gear provides clearance for the bevel teeth of the second gear whenever the input shaft is rotated from the forward limit toward the reverse limit. In the preferred embodiment, an endmost one of the bevel teeth of the second gear is disposed to engage an endmost one of the bevel teeth of the third gear, at the other end of the peripheral array of bevel teeth of the third gear, and the peripheral gap between the bevel teeth of the third gear provides clearance for the bevel teeth of the first gear whenever the input shaft is rotated from the reverse limit toward the forward limit.

These and other objects, features, and advantages of this invention are evident from the following description of a preferred embodiment of this invention with reference to the accompanying drawings.

DETAILED DESCRIPTION OF PREFERRED EMBODIMENT

Figure 1:
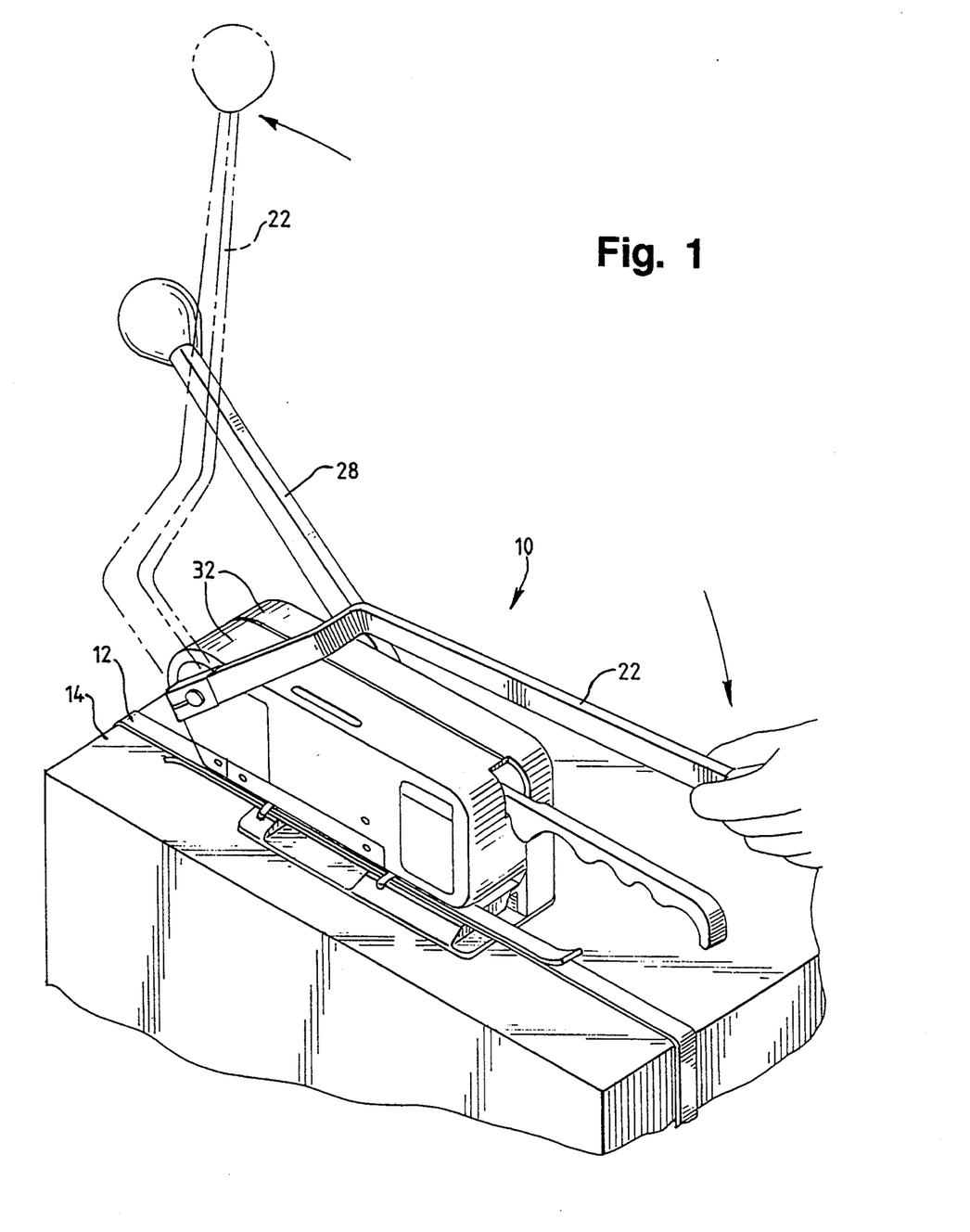
FIG. 1 is a perspective view of a strapping tool employing a mechanism according to this invention for converting oscillator rotation of an input shaft, to which an actuating handle is coupled, to unidirectional rotation of an output shaft. A package and a steel strap for strapping the package are shown fragmentarily. An actuating handle is shown in dashed lines as approaching a limit of forward motion of such handle and in full lines as approaching a limit of reverse motion of such handle.
Figure 2:
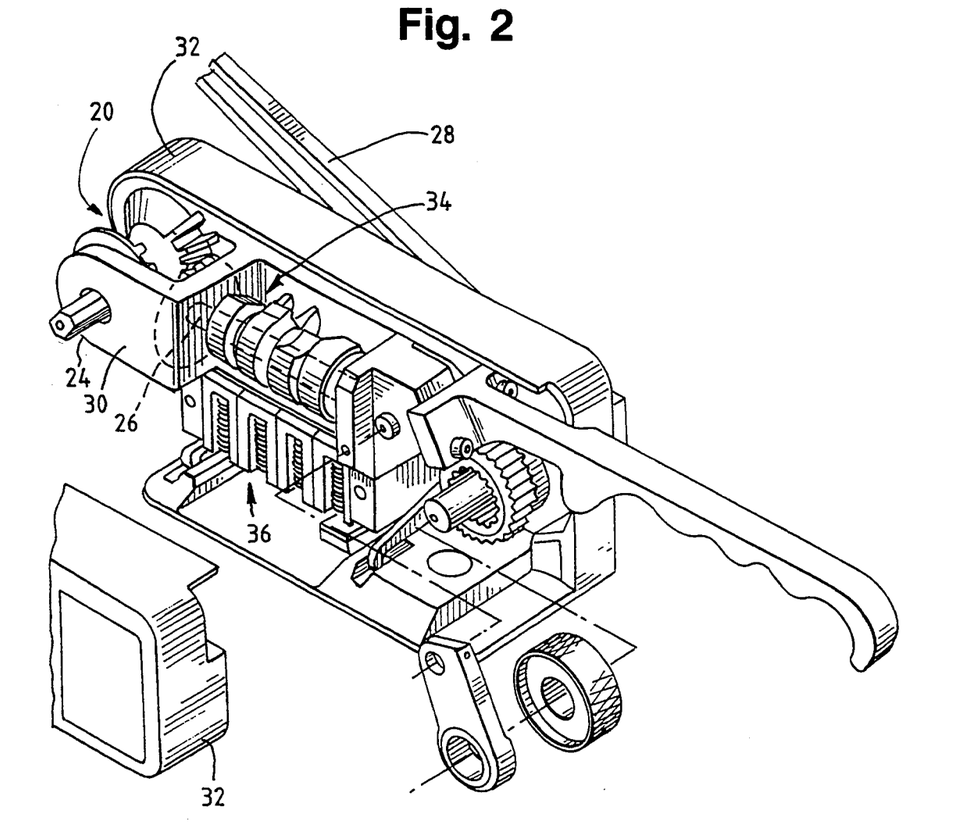
FIG. 2 is a fragmentary, perspective, partly exploded view of the strapping tool. The actuating handle, a side cover, and certain internal elements have been removed in FIG. 2 so as to reveal some internal details of the strapping tool.

As shown in the drawings, particularly in FIGS. 1 and 2, a strapping tool 10 of the type noted above is used to apply a steel strap 12 in a tensioned loop around a package 14 and to join the strap 12 via a series of interlocking joints (not shown) comprising interlockable shoulders punched into overlapped ends of the strap 12. As shown generally in FIG. 2 and specifically in FIGS. 3 through 11, the strapping tool 10 employs a mechanism 20 for converting oscillatory motion of an actuating handle 22 and oscillatory rotation of an input shaft 24 to unidirectional rotation of an output shaft 26. The mechanism 20 constitutes a preferred embodiment of this invention.

As shown in FIGS. 1 and 2, the strapping tool 10 comprises two other mechanisms outside the scope of this invention, namely a mechanism including a tensioning handle 28 for tensioning the strap 12 around the package 14 and a mechanism for admitting the overlapped ends of the strap 12 into the tool 10, retaining the overlapped ends so as to facilitate punching a series of interlockable shoulders into the overlapped ends, and releasing the overlapped ends from the tool 10. The tensioning mechanism and the admitting, retaining, and releasing mechanism are disclosed in a copending U.S. application Ser. No. 08/133,290 filed Oct. 8, 1993, assigned commonly herewith, and entitled STRAPPING TOOL WITH MECHANISM FOR ADMITTING, RETAINING, AND RELEASING STEEL STRAP, the disclosure of which application is incorporated herein by reference. Except as disclosed in the copending application, the tensioning mechanism may be substantially similar to the tensioning mechanisms used in known strapping tools of the type noted above.

As shown in FIGS. 1 and 2, the strapping tool 10 comprises a frame 30 for the mechanism 20 and for other elements of such tool 10, along with two side covers 32 enclosing the mechanism 20 and other elements of such tool 10. The actuating handle 22, one of the side covers 32, and other elements have been removed in FIG. 2 so as to reveal some internal details of such tool 10. The frame 30 is assembled from multiple parts.

The input shaft 24, which defines an input axis, is journalled to the frame 30 and is rotatable about the input axis. The output shaft 26, which defines an output axis, is journalled to the frame 30 and is rotatable about the output axis. The output axis is normal to the input axis.

The strapping tool 10 comprises a series of cams 34 mounted on the output shaft 26 so as to enable conjoint rotation of the cams 34 with the output shaft 26. The cams 34 are arranged to drive a series of punches 36, which are arranged to punch interlockable shoulders into overlapped ends of the strap 12 in a known manner. The cams and punches may be substantially similar to the cams and punches employed on known strapping tools of the type noted above.

The actuating handle 22 is pivotable manually about the input axis, over a range of pivotal motion, between a forward limit and a reverse limit. The actuating handle 22 is shown in dashed lines in FIG. 1 and in full lines in FIGS. 3 and 4 as approaching the forward limit of its range of pivotal motion. The actuating handle 22 is shown in full lines in FIGS. 1, 5, and 6 as approaching the reverse limit of its range of pivotal motion.

The actuating handle 22 is coupled to the input shaft 24 so that the input shaft 24 is rotated about the input axis as the actuating handle 22 is pivoted about the input axis. Thus, the input shaft 24 is rotatable over a range of rotational motion, between a forward limit corresponding to the forward limit of the actuating handle 22 and a reverse limit corresponding to the reverse limit of the actuating handle 22. A lever 40 is mounted to the input shaft 24 so as to be conjointly pivoted about the input axis as actuating handle 22 is pivoted so as to rotate the input shaft 24. The frame 30 has a boss 42 having a lower, bevelled surface 44 and an upper, bevelled surface 46.

Figure 4:
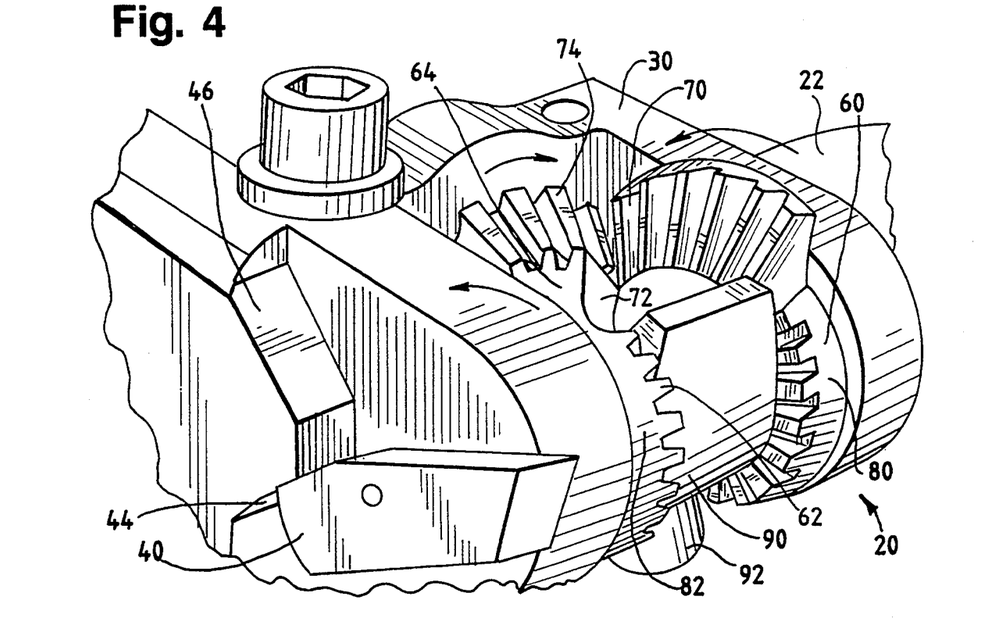
Figure 6:
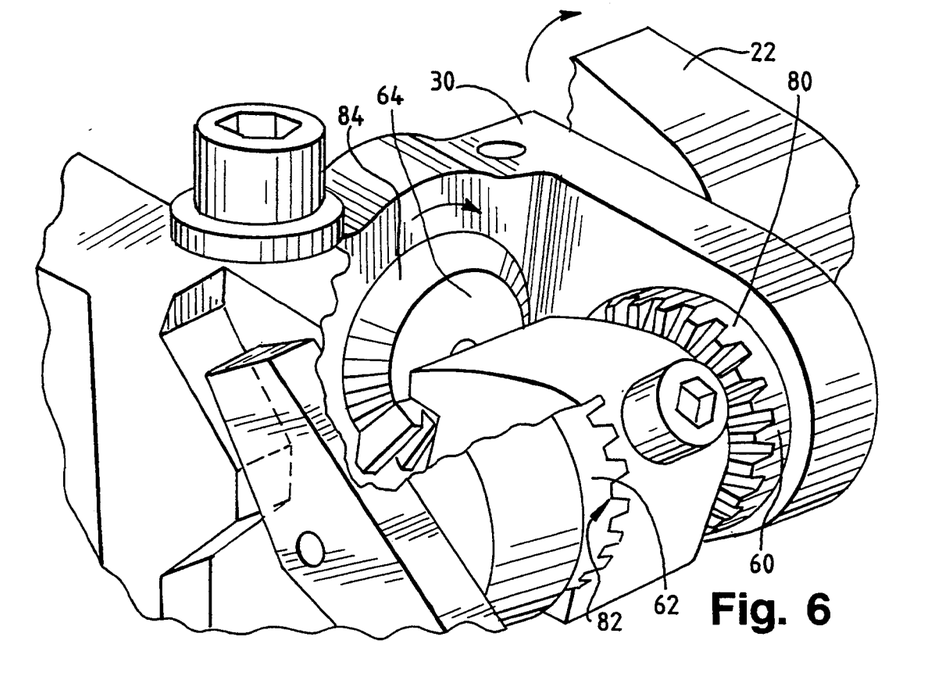

As shown in FIG. 4, when the actuating handle 22 reaches the forward limit of its range of pivotal motion and the input shaft 24 reaches the forward limit of its range of rotational motion, the lower, bevelled surface 44 is engaged by the lever 40 to arrest the actuating handle 22 and the input shaft 24. As shown in FIG. 6, when the actuating handle 22 reaches the forward limit of its range of pivotal motion and the input shaft 24 reaches the reverse limit of its range of rotational motion, the upper, bevelled surface 46 is engaged by the lever 40 to arrest the actuating handle 22 and the input shaft 24.

As shown in FIGS. 3 through 11, the mechanism 10 employs three bevel gears, namely a first gear 60, a second gear 62, and a third gear 64. The first gear 60 is coupled to the input shaft 24 so as to enable conjoint rotation of the first gear 60 and the input shaft 24. The second gear 62 is coupled to the input shaft 24 so as to enable conjoint rotation of the second gear 62 and the input shaft 24. The third gear 64 is coupled to the output shaft 26 so as to enable conjoint rotation of the third gear 64 and the output shaft 26.

Each gear has six bevel teeth extending successively in a peripheral array encompassing less than one half of the entire periphery of such gear. Thus, the first gear 60 has six bevel teeth 70, the second gear 62 has six bevel teeth 72, and the third gear 64 has six bevel teeth 74. Also, the first gear 60 defines a peripheral gap 80 between the first and last teeth 70, the second gear 62 defines a peripheral gap 82 between the first and last teeth 72, and the third gear 64 defines a peripheral gap 84 between the first and last teeth 74. The first gear 60 is cylindrical, as shown, along the peripheral gap 80. The second gear 62 is cylindrical, as shown, along the peripheral gap 82. The third gear 64 is frusto-conical, as shown, along the peripheral gap 84.

Figure 7:
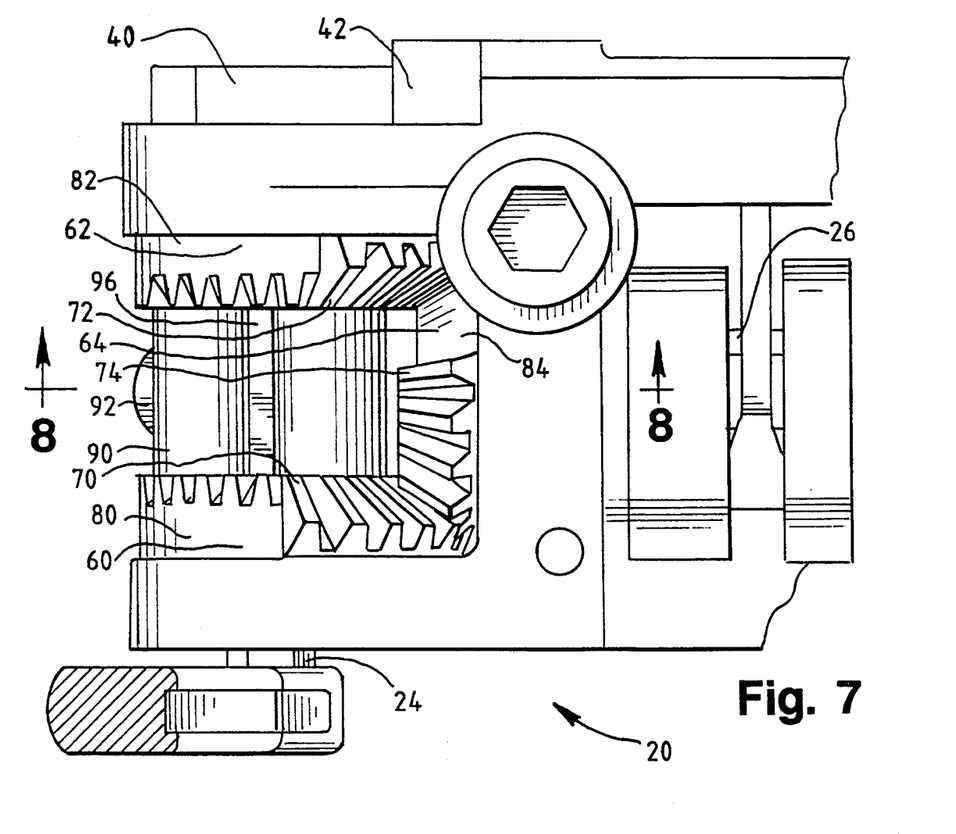
FIG. 7, on a similar scale, is a plan view thereof with the input shaft in a rotational position between the forward and reverse limits of its range of oscillatory rotation.

As shown in FIGS. 3 through 11, the bevel teeth of each gear extend successively in a peripheral array encompassing less than one half of the entire periphery of such gear, e.g. approximately 120°. As shown therein, the peripheral gap defined by such gear encompasses more than one half of the entire periphery of such gear, e.g. approximately 240°. The first gear 60 and the second gear 62 are spaced axially along the input shaft 24. As shown in FIG. 7, the bevel teeth 60 of the first gear 60 face the bevel teeth 72 of the second gear 62 along the input axis defined by the input shaft 24, except that the bevel teeth 70 of the first gear 60 are displaced rotationally by one tooth width relative to the bevel teeth 72 of the second gear 62.

Figure 8:
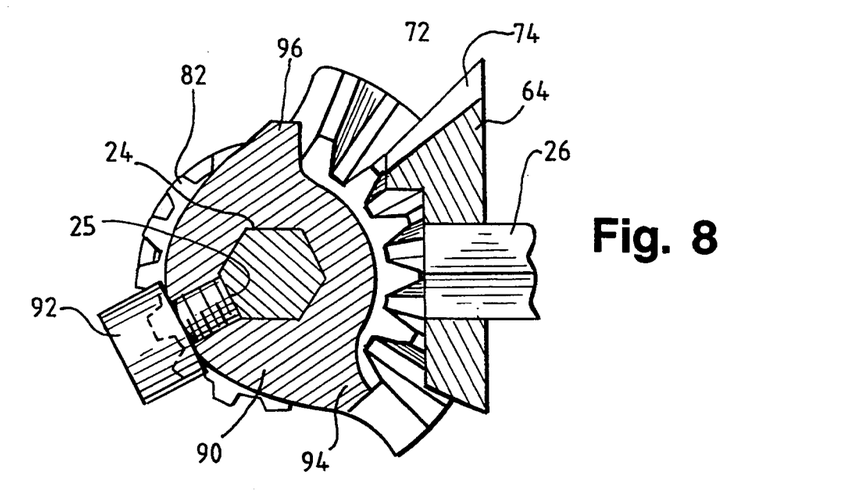
FIG. 8 is a sectional view taken along line 8-8 of FIG. 7, in a direction indicated by arrows.
Figure 9:
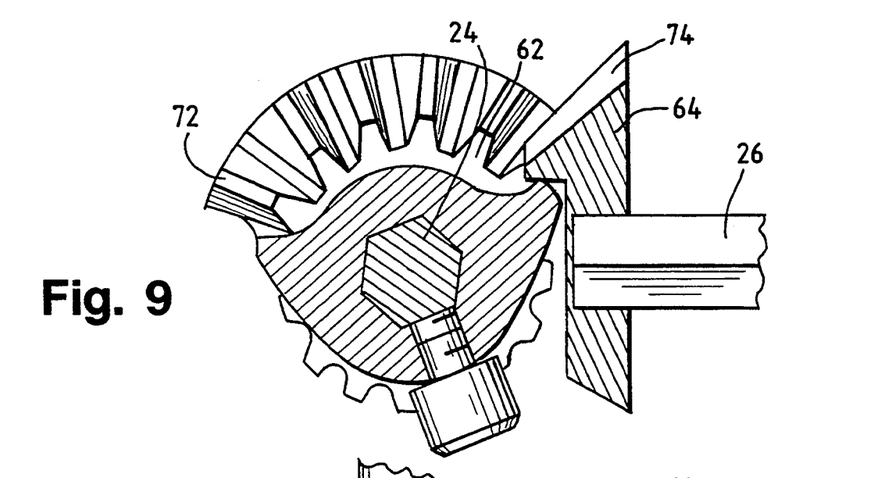
FIG. 9 is a sectional view similar to FIG. 8 but taken with the input shaft at the forward limit of its range of oscillatory rotation.
Figure 10:
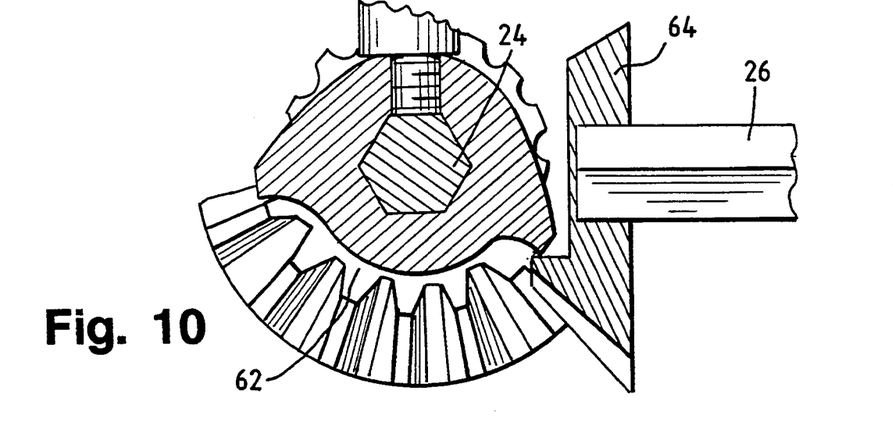
FIG. 10 is a sectional view similar to FIG. 8 but taken with the input shaft at the reverse limit of its range of oscillatory rotation.
Figure 11:
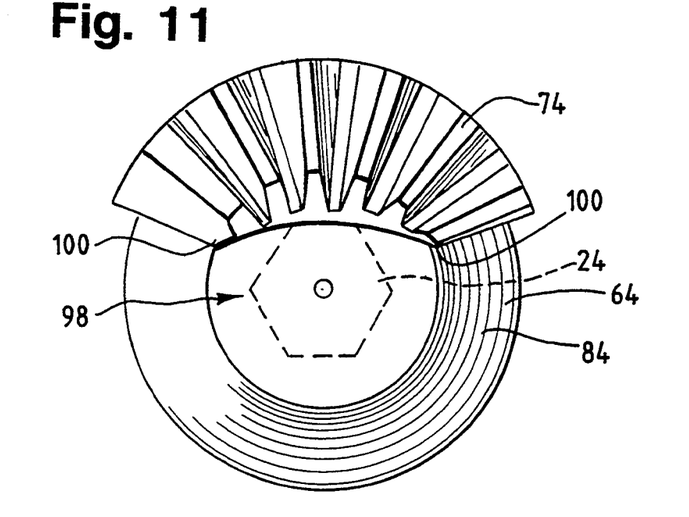
FIG. 11 is an axial view of one bevel gear of the mechanism, namely the bevel gear coupled to the output shaft.

A spacer 90 is interposed between the first gear 60 and the second gear 62 and is secured to the input shaft 24 via a set screw 92. As shown in FIGS. 8, 9, and 10, the input shaft 24 is hexagonal in cross-section where the spacer 90 is secured via the set screw 92, which bears against a flat surface 25 of the input shaft 24. As shown therein, the spacer 90 has two peripherally spaced lobes for purposes to be later described, namely a forward lobe 94 and a reverse lobe 96.

Figure 3:
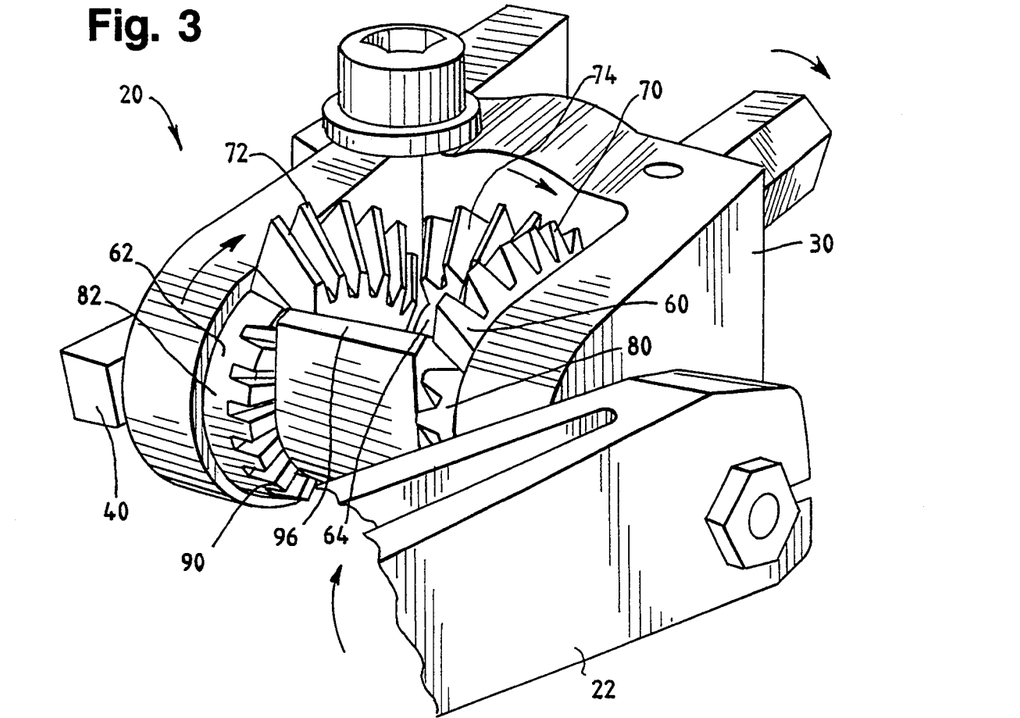
FIGS. 3 and 4, on a larger scale and from different vantages, are fragmentary, perspective views of three bevel gears and other elements of the mechanism noted above with the input shaft at a forward limit of its range of oscillatory rotation.

As shown in FIGS. 3 and 4, the bevel teeth of the respective gears are arranged so that the bevel teeth 74 of the third gear 64 intermesh only with the bevel teeth 70 of the first gear 60 upon rotation of the input shaft 24 from the forward limit of its range of rotational movement toward the reverse limit thereof, whereupon the bevel teeth 72 of the second gear 62 do not engage the third gear 64 because of the peripheral gap 84 defined by the third gear 64.

Figure 5:
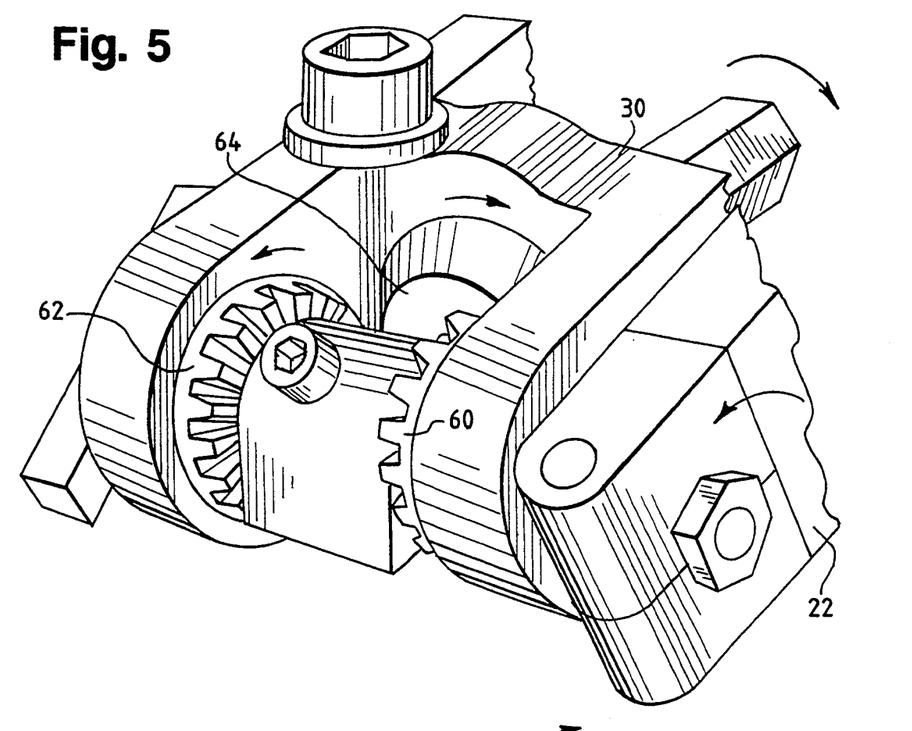
FIGS. 5 and 6, on a similar scale and from comparable vantages, are fragmentary, perspective views thereof with the input shaft at a reverse limit of the range of oscillatory rotation of the input shaft.

As shown in FIGS. 5 and 6, the bevel teeth of the respective gears are arranged so that the bevel teeth 74 of the third gear 64 intermesh only with the bevel teeth 72 of the second gear 62 upon rotation of the input shaft 24 from the forward limit of its range of rotational movement toward the reverse limit thereof, whereupon the bevel teeth 70 of the first gear 60 do not engage the third gear 64 because of the peripheral gap 84 defined by the third gear 64.

As shown in FIGS. 8, 9, 10, and 11, among other views, the third gear 64 has an axial recess 98 defining spaced shoulders 100 at opposite ends of the peripheral gap 84 between the bevel teeth 74 of the third gear 64. As shown in FIG. 9, the forward lobe 94 engages the spaced shoulders 100 when the input shaft 24 reaches the forward limit of its range of rotational motion, so as to prevent further rotation of the third gear 64 and the output shaft 26. As shown in FIG. 10, the reverse lobe 96 engages the spaced shoulders 100 when the input shaft 24 reaches the reverse limit of its range of rotational motion, so as to prevent further rotation of the third gear 64 and the output shaft 26.

As permitted by the peripheral gap 80 between the bevel teeth 70 of the first gear 64, an endmost one of the bevel teeth 70 of the first gear 60 is disposed to engage an endmost one of the bevel teeth 74 of the third gear 70, at a given end of the peripheral array of bevel teeth 74 of the third gear 70, and the peripheral gap 84 between the bevel teeth 74 of the third gear 70 provides clearance for the bevel teeth 72 of the second gear 62 whenever the input shaft 24 is rotated from the forward limit toward the reverse limit. As permitted by the peripheral gap 82 between the bevel teeth 72 of the second gear 62, an endmost one of the bevel teeth 72 of the second gear 62 is disposed to engage an endmost one of the bevel teeth 74 of the third gear 64, at the other end of the peripheral array of bevel teeth 74 of the third gear 64, and the peripheral gap 84 between the bevel teeth 74 of the third gear 64 provides clearance for the bevel teeth of the first gear 60 whenever the input shaft 24 is rotated from the reverse limit toward the forward limit.

Various modifications may be made in the preferred embodiment described above without departing from the scope and spirit of this invention.

We claim:

1. A mechanism for converting oscillatory rotation of an input shaft to unidirectional rotation of an output shaft, the mechanism comprising
   (a) a frame,
   (b) an input shaft journalled to the frame, the input shaft defining an input axis and being rotatable about the input axis, over a range of rotational positions of the input shaft relative to the frame, between a forward limit of the range and a reverse limit of the range,
   (c) an output shaft journalled to the frame, the output shaft defining an output axis and being rotatable about the output axis, the output axis being normal to the input axis,
   (d) three bevel gears, namely a first gear coupled to the input shaft so as to enable conjoint rotation of the first gear and the input shaft, a second gear coupled to the input shaft so as to enable conjoint rotation of the second gear and the input shaft, and a third gear coupled to the output shaft so as to enable conjoint rotation of the third gear and the output shaft, the first and second gears being spaced axially from each other along the input shaft, the first gear having a peripheral array of bevel teeth, the second gear having a peripheral array of bevel teeth, said teeth being arranged so that the bevel teeth of the third gear intermesh only with the bevel teeth of one of the first and second gears at any time when the input shaft rotates between the forward and reverse limits.

2. The mechanism of claim 1 wherein the bevel teeth of the first, second, and third gears are arranged so that the bevel teeth of the third gear intermesh only with the bevel teeth of the first gear teeth upon rotation of the input shaft from the reverse limit toward the forward limit and so that the bevel teeth of the third gear intermesh only with the bevel teeth of the second gear upon rotation of the input shaft from the forward limit toward the reverse limit.

3. The mechanism of claim 2 wherein the bevel teeth of each of the first, second, and third gears extend around less than the entire periphery of such gear.

4. The mechanism of claim 3 wherein the bevel teeth of the third gear extend around less than one half of the entire periphery of the third gear.

5. The mechanism of claim 3 wherein the bevel teeth of each of the first, second, and third gears extend around less than one half of the entire periphery of such gear so as to define a peripheral gap between the bevel teeth of such gear.

6. The mechanism of claim 5 wherein an endmost one of the bevel teeth of the first gear is disposed to engage an endmost one of the bevel teeth of the third gear, at a given end of the peripheral array of bevel teeth of the third gear, and the peripheral gap between the bevel teeth of the third gear provides clearance for the bevel teeth of the second gear whenever the input shaft is rotated from the forward limit toward the reverse limit and wherein an endmost one of the bevel teeth of the second gear is disposed to engage an endmost one of the bevel teeth of the third gear, at the other end of the peripheral array of bevel teeth of the third gear, and the peripheral gap between the bevel teeth of the third gear provides clearance for the bevel teeth of the first gear whenever the input shaft is rotated from the reverse limit toward the forward limit.

* * * * *